United States Patent
Daly, Jr.

(10) Patent No.: US 12,530,800 B2
(45) Date of Patent: Jan. 20, 2026

(54) METHODS AND APPARATUS FOR CALIBRATING STEREO IMAGERY USING MOTION OF VEHICLE

(71) Applicant: PlusAI, Inc., Santa Clara, CA (US)

(72) Inventor: Timothy P. Daly, Jr., San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 321 days.

(21) Appl. No.: 18/367,945

(22) Filed: Sep. 13, 2023

(65) Prior Publication Data

US 2024/0005557 A1    Jan. 4, 2024

Related U.S. Application Data

(63) Continuation of application No. 17/855,168, filed on Jun. 30, 2022, now Pat. No. 11,798,192.

(51) Int. Cl.
*G06T 7/80* (2017.01)
*G06T 7/246* (2017.01)
(Continued)

(52) U.S. Cl.
CPC .............. *G06T 7/85* (2017.01); *G06T 7/246* (2017.01); *G06T 7/285* (2017.01); *G06T 7/593* (2017.01);
(Continued)

(58) Field of Classification Search
None
See application file for complete search history.

(56) References Cited

U.S. PATENT DOCUMENTS 8,428,342 B2 * 4/2013 Tian ............... H04N 13/271
 348/42
9,204,127 B1 * 12/2015 Cole ............... H04N 13/20
(Continued)

FOREIGN PATENT DOCUMENTS

CN      108765486 A    11/2018
WO   WO-2022205934 A1 * 10/2022 ........... H04N 13/122

OTHER PUBLICATIONS

Lima, D. A., Vitor, G. B., Victorino, A. C., & Ferreira, J. V. (Nov. 2013). A disparity map refinement to enhance weakly-textured urban environment data. In 2013 16th International Conference on Advanced Robotics (ICAR) (pp. 1-6). IEEE. (Year: 2013).*

(Continued)

*Primary Examiner* — Ian L Lemieux
(74) *Attorney, Agent, or Firm* — Rimon Law, P.C.

(57) ABSTRACT

A system includes sensors onboard an autonomous vehicle, a processor, and a memory. The memory stores instructions for the processor to receive a first image pair from the sensors at a first time and a second image pair from the sensors at a second time. Each image pair includes at least one static feature in an environment of the autonomous vehicle. The memory also stores instructions to determine a distance travelled by the autonomous vehicle between the first and second times, and to determine a correction to a disparity map based on (1) a first disparity associated with the static feature(s) and the first image pair, (2) a second disparity associated with the static feature(s) and the second image pair, and (3) the distance travelled. The memory also stores instructions to cause the correction to be applied to the disparity map.

20 Claims, 19 Drawing Sheets

(51) Int. Cl.
  *G06T 7/285* (2017.01)
  *G06T 7/593* (2017.01)
  *G06T 17/05* (2011.01)
(52) U.S. Cl.
  CPC .... *G06T 17/05* (2013.01); *G06T 2207/30252* (2013.01)

(56) References Cited

U.S. PATENT DOCUMENTS

| | | | |
|---|---|---|---|
| 9,300,946 | B2 | 3/2016 | Do et al. |
| 10,733,761 | B2* | 8/2020 | Kroeger ............... G06T 7/85 |
| 11,032,530 | B1* | 6/2021 | Bleyer ............. H04N 13/128 |
| 2014/0132715 | A1* | 5/2014 | Raghoebardayal ... A63F 13/212 348/43 |
| 2014/0168377 | A1 | 6/2014 | Cluff et al. |
| 2014/0240310 | A1* | 8/2014 | Guseva ............... G06T 7/593 345/419 |
| 2015/0145965 | A1 | 5/2015 | Livyatan et al. |
| 2016/0063703 | A1 | 3/2016 | Sasaki et al. |
| 2016/0227187 | A1* | 8/2016 | Supikov ............ H04N 13/128 |
| 2017/0127046 | A1* | 5/2017 | Das .................. H04N 13/239 |
| 2017/0339397 | A1 | 11/2017 | Livyatan et al. |
| 2017/0359561 | A1* | 12/2017 | Vallespi-Gonzalez ..................... H04N 13/239 |
| 2018/0286076 | A1 | 10/2018 | Lindgren |
| 2018/0307310 | A1* | 10/2018 | McCombe .......... G06F 3/04815 |
| 2019/0012789 | A1* | 1/2019 | Cutu ..................... G06T 7/11 |
| 2019/0304164 | A1 | 10/2019 | Zhang |
| 2019/0333237 | A1* | 10/2019 | Javidnia ............... G06T 7/593 |
| 2020/0302627 | A1* | 9/2020 | Duggal ............... G06N 20/00 |
| 2020/0357140 | A1 | 11/2020 | Kroeger |
| 2021/0090281 | A1 | 3/2021 | Geva et al. |
| 2021/0358156 | A1* | 11/2021 | Price ............... G06V 10/7715 |
| 2021/0398306 | A1* | 12/2021 | Bleyer ............... G06T 19/006 |
| 2022/0254047 | A1* | 8/2022 | Geva ................. H04N 13/246 |
| 2022/0366589 | A1* | 11/2022 | Zou .................... G06T 3/40 |
| 2023/0152883 | A1* | 5/2023 | Mccombe ........... H04N 23/80 382/103 |
| 2023/0351769 | A1* | 11/2023 | Wu ................... G06V 10/762 |
| 2023/0356743 | A1* | 11/2023 | Wang ................ G06V 20/588 |

OTHER PUBLICATIONS

Murarka, A., & Kuipers, B. (Oct. 2009). A stereo vision based mapping algorithm for detecting inclines, drop-offs, and obstacles for safe local navigation. In 2009 IEEE/RSJ International Conference on Intelligent Robots and Systems (pp. 1646-1653). IEEE. (Year: 2009).*
Fakhfakh, N., Gruyer, D., & Aubert, D. (Jun. 2013). Weighted v-disparity approach for obstacles localization in highway environments. In 2013 IEEE Intelligent Vehicles Symposium (IV) (pp. 1271-1278). IEEE. (Year: 2013).*
Miclea, V. C., Miclea, L., & Nedevschi, S. (Nov. 2018). Real-time stereo reconstruction failure detection and correction using deep learning. In 2018 21st International Conference on Intelligent Transportation Systems (ITSC) (pp. 1095-1102). IEEE. (Year: 2018).*
da Silva Vieira, G., Soares, F. A. A., Laureano, G. T., Parreira, R. T., Ferreira, J. C., & Salvini, R. (Jun. 2018). Disparity map adjustment: a post-processing technique. In 2018 IEEE Symposium on Computers and Communications (ISCC) (pp. 00580-00585). IEEE. (Year: 2018).*
Benedetti, Luca, et al. "Color to Gray Conversions in the Context of Stereo Matching Algorithms", Machine Vision and Applications, vol. 23, No. 2, 2012 (Year: 2012), pp. 327-348.
Szeliski, Richard. "Computer Vision: Algorithms and Applications", Springer, 2011 (Year: 2011), 824 pages.
Van Der Mark, Wannes, et al., "Real-Time Dense Stereo for Intelligent Vehicles", IEEE Transactions on Intelligent Transportation Systems, vol. 7, No. 1, 2006 (Year: 2006), pp. 38-50.

* cited by examiner

METHODS AND APPARATUS FOR CALIBRATING STEREO IMAGERY USING MOTION OF VEHICLE

CROSS-REFERENCE TO RELATED APPLICATIONS

This application is a continuation of U.S. patent application Ser. No. 17/855,168, filed Jun. 30, 2022 and entitled "METHODS AND APPARATUS FOR CALIBRATING STEREO IMAGERY USING MOTION OF VEHICLE", which is incorporated herein by reference.

FIELD

The present disclosure relates to imaging technologies applicable to vehicle control, for example for autonomous vehicles or partially autonomous vehicles (e.g., driver-assisted vehicles), and more specifically, to methods of calibration of stereo imagery.

BACKGROUND

Vehicles, such as autonomous vehicles, typically include a wide variety of electronics such as cameras, global positioning system (GPS) navigation systems, radar systems, lidar systems, sonar systems, and inertial measurement units (IMUs). Such electronics can be used to track and/or control the vehicles.

SUMMARY

In some embodiments, a system includes sensors configured to be onboard a vehicle (such as an autonomous vehicle), a processor configured to be located at or on the vehicle, and a memory configured to be located at or on the vehicle. The memory stores instructions to cause the processor to receive a first image pair from the sensors at a first time and a second image pair from the sensors at a second time. Each of the first image pair and the second image pair includes a representation of at least one static feature in an environment of the vehicle. The memory also stores instructions to determine a distance travelled by the vehicle between the first and second times, and to determine a correction to a disparity map based on (1) a first disparity associated with the at least one static feature and the first image pair, (2) a second disparity associated with the at least one static feature and the second image pair, and (3) the distance travelled. The determination of the distance travelled by the vehicle between the first and second times can be performed, for example, based on global positioning system (GPS) data, loop closure (e.g., recognizing a previously-visited location), and/or one or more other satellite systems (e.g., Glonass, Galileo, etc.). The memory also stores instructions to cause transmission of a signal to cause the correction to be applied to the disparity map.

In some embodiments, a non-transitory, processor-readable medium stores instructions that, when executed by a processor located at or on a vehicle, cause the processor to receive a first image pair from a plurality of sensors configured to be onboard the vehicle at a first time, and to receive a second image pair from the plurality of sensors at a second time. Each of the first image pair and the second image pair can include a representation of at least one static feature in an environment of the vehicle. The instructions also include instructions to cause the processor to determine a first location of the vehicle associated with the first time and a second location of the vehicle associated with the second time. The instructions also include instructions to cause the processor to determine, based on (1) a first disparity associated with the at least one static feature and the first image pair, (2) a second disparity associated with the at least one static feature and the second image pair, (3) the first location of the vehicle, and (4) the second location of the vehicle, a correction to a disparity map associated with the first image pair and the second image pair. The determination of the first location of the vehicle associated with the first time and/or the second location of the vehicle associated with the second time can be performed, for example, based on global positioning system (GPS) data, loop closure (e.g., recognizing a previously-visited location), and/or one or more other satellite systems (e.g., Glonass, Galileo, etc.). The instructions also include instructions to cause the processor to cause transmission of a signal to cause the correction to be applied to the disparity map.

In some embodiments, a method includes receiving a first image pair from a plurality of sensors configured to be onboard the vehicle at a first time and while the vehicle is travelling, and receiving a second image pair from the plurality of sensors at a second time and while the vehicle is travelling. Each of the first image pair and the second image pair includes a representation of at least one static feature in an environment of the vehicle. The method also includes determining location data associated with the vehicle, and determining, based on (1) a first disparity associated with the at least one static feature and the first image pair, (2) a second disparity associated with the at least one static feature and the second image pair, and (3) the location data associated with the vehicle, a correction to a disparity map associated with the first image pair and the second image pair. The determination of the location data associated with the vehicle can be performed, for example, based on global positioning system (GPS) data, loop closure (e.g., recognizing a previously-visited location), and/or one or more other satellite systems (e.g., Glonass, Galileo, etc.). The correction can include at least one of a yaw correction or a depth correction.

DETAILED DESCRIPTION

Figure 1:
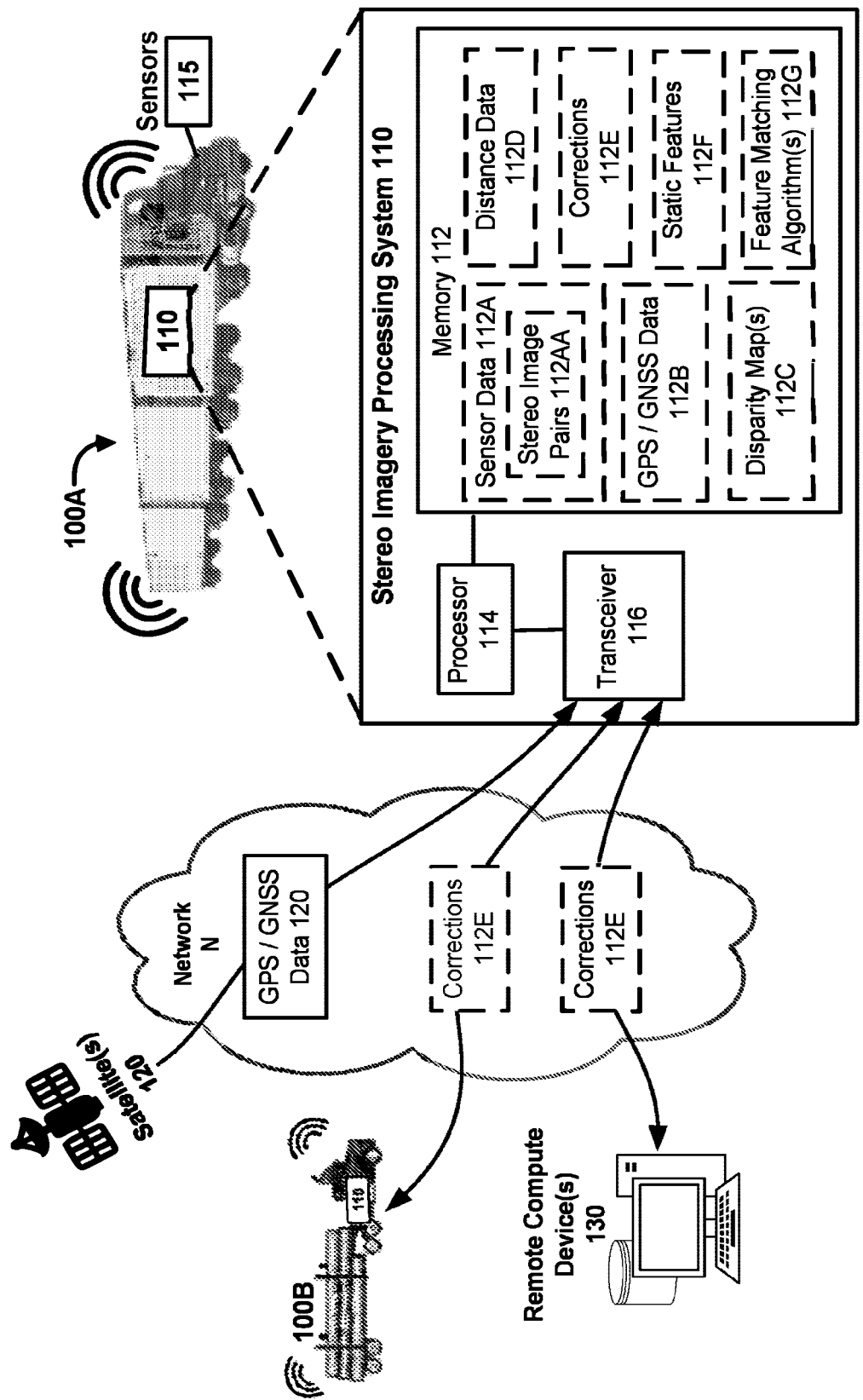
FIG. 1 is a diagram showing a stereo imagery processing system for a vehicle, according to some embodiments.

Systems and methods described herein facilitate improved calibration of stereo imagery (e.g., including corrections to depth accuracy), such as stereo imagery generated by cameras onboard a vehicle (e.g., an autonomous vehicle), for example while the vehicle is traveling, and optionally in real-time or substantially real-time. More specifically, location and/or motion data (e.g., "ego motion," or the three-dimensional (3D) motion of a camera within an environment) can be used to supplement and apply corrections to image data, as discussed herein. In particular, systems and methods described herein can correct for dynamic changes to calibration caused by, for example, temperature changes, air pressure, distortion of the vehicle by the road grade, bumps in the road, vibrations, etc.

Data generated by a navigation system such as a GPS, a Global Navigation Satellite System (GNSS), a loop closure system, and other satellite systems (e.g., Glonass, Galileo, etc.) can have an associated error that is substantially uniformly-sized, or "bounded." Thus, the data generated by a navigation system can complement, and be used to verify or adjust, data from other related data sets (such as image data) having more variable or unpredictable error. Alternatively or in addition, data having variable or unpredictable error can be adjusted (or "calibrated") based on historical data and/or feature detection. For example, a given set of image data (e.g., stereo image pairs) can be reprojected onto historical image data by aligning the associated images via registration of matching points and/or using high accuracy ego motion data.

In some embodiments, stereo imagery including a first image pair and a second image pair is generated by sensor configured to be onboard a vehicle while the vehicle is travelling, and one or more disparity maps are generated based on the stereo imagery. As used herein, a "disparity map" (also referred to as a "depth map") refers to a set of depth information calculated based on correlations between points within stereo images of stereo image pairs. "Disparity" can refer to depth represented as a difference in pixel coordinates for a common feature between a primary camera and a secondary camera. Values of a depth map can have units, for example, of meters. A motion-based disparity correction is then performed on the one or more disparity maps, to obtain improved-accuracy depth data. The motion-based disparity correction includes receiving the first image pair at a processor of a vehicle at a first time, and receiving the second image pair at the processor at a second time. Each of the first image pair and the second image pair can include a representation of at least one common static feature in an environment of the vehicle. The at least one static feature can include, for example, a building, signage along a roadway, greenery/trees, parked vehicles, or any other object that is not moving during a time period that includes the first time and the second time. In other words, the at least one static feature is not moving during the time period, whereas the vehicle is moving during the time period. A distance travelled by the vehicle between the first and second times can be determined based on navigation data (e.g., GPS data, loop closure data, and/or data from one or more other satellite systems (e.g., Glonass, Galileo, etc.)). A correction to the disparity map(s) associated with at least one of the first image pair or the second image pair can then be calculated based on (1) a first disparity associated with the at least one static feature and the first image pair, (2) a second disparity associated with the at least one static feature and the second image pair, and (3) the distance travelled. A signal can then be generated and transmitted, to cause the correction to be applied (e.g., within a local memory of the vehicle, within a local memory of at least one other vehicle from a fleet of vehicles, or at one or more remote servers) to the disparity map.

Motion-Based Stereo Calibration Refinement

Using GNSS-based positioning gives a roughly constant sized error in positioning, whereas stereo calibration errors produce errors that grow quadratically with distance from the sensor(s). Systems and methods of the present disclosure leverage these complementary properties by using two stereo frames taken some distance apart (optionally a pre-defined/pre-specified distance), the stereo frames including image data for one or more static features in the "environment" (e.g., an environment of a travelling vehicle, and depicting a scene), and comparing the position change of the one or more static features in the environment based on a GNSS-based position change (also referred to herein as a "known motion") detected for the stereo camera(s) itself/themselves. The difference in the apparent motion of the static feature(s) can be compared with the known motion of the camera(s) to calculate one or more calibration corrections. The foregoing approach produces calibration corrections that are significantly more accurate than known calibration techniques, and can be performed in a concurrent (e.g., in real-time or substantially real-time, and while the vehicle is travelling) and efficient manner. For example, since some known stereo camera systems already calculate a dense depth map for each frame, and methods described herein are compatible with such dense depth maps, there is no incremental computational overhead with regard to the dense depth maps. Moreover, according to some methods presented herein, stereo corrections can be determined using transformation and subtraction, without calculating and matching image features (as might be performed, for example, in a known sparse simultaneous localization and mapping (SLAM) system) and without performing nonlinear optimization as in bundle adjustments.

In stereo imaging, small-magnitude errors in estimates of yaw between stereo heads (i.e., a primary camera and a secondary camera of a stereo camera system) can result in large changes to depth estimates. It can be difficult to recover an exact (high accuracy) yaw value, for example because small yaw changes can appear almost identical to translations along a stereo baseline, or, equivalently, depth changes. Time-of-flight sensors such as radar or lidar sensors may be used to correct the yaw by projecting their data into the stereo images and calculating a disparity correction. Time-of-flight sensors typically exhibit a constant depth error, so towards the end of a working range of the stereo camera, the error of the time-of-flight sensor(s) is much smaller than the depth errors induced by incorrect camera yaw. Lidar ranges, however, can be too short for this procedure to be effective in many applications of interest. Radar can be effective across a wider variety of applications, however, few radar returns per frame are typical, and thus ambiguity exists as to which portions of the images correspond to or are associated with the radar returns, particularly in the vertical direction. Thus, the estimates can sometimes be noisy or inaccurate, and convergence can be slow.

As discussed herein, in some embodiments, the foregoing issues can be addressed by using ego motion to correct depth information associated with stereo images. For example, as discussed above, GPS data has substantially constant-sized error. The measured apparent motion of a stationary object(s) appearing in stereo data as a vehicle drives towards the stationary object(s) should be the inverse of the ego motion. If a correspondence between two camera frames is known, a relative motion can be calculated as follows:

$$\text{measured\_motion} = f*b/\text{disparity1} - f*b/\text{disparity2},$$

where "f" refers to focal length, "*" refers to multiplication, and "b" refers to a baseline measurement.

If it is assumed that there is a constant error in the disparity maps due to a yaw change, the above expression can be written as:

$$\text{measured\_motion} = f*b/(\text{disparity1}-\text{err}) - f*b/(\text{disparity2}-\text{err})$$

Since the motion of the static object is caused by ego motion, the ego motion can be substituted into the expression, as follows:

$$\text{ego\_motion} = f*b/(\text{disparity1}-\text{err}) - f*b/(\text{disparity2}-\text{err})$$

The expression can then be solved for error ("err"), and the error can be subtracted from the disparity map to correct the yaw estimate (thereby improving stereo depth accuracy).

FIG. 1 is a diagram showing a stereo imagery processing system for a vehicle, according to some embodiments. As shown in FIG. 1, the stereo imagery processing system 110 is onboard a vehicle (e.g., an autonomous vehicle) 100A, and includes a processor 114 that is operably coupled to a transceiver 116 and a memory 112. As used herein, an "autonomous vehicle" can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level 1 but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The vehicle 100A also includes multiple sensors 115, which can include, but are not limited to, one or more a camera(s), a global positioning system (GPS) navigation system(s), a radar system(s), a lidar system(s), a sonar system(s), and/or an inertial measurement unit(s) (IMUs). The memory 112 stores one or more of: sensor data 112A, GPS/GNSS data 112B, disparity map(s) 112C, distance data 112D, corrections 112E, static features 112F, and feature matching algorithm(s) 112G. The sensor data 112A can include sensor data generated by the sensors 115 and/or sensor data received at the stereo imagery processing system 110 (for example, via the transceiver 116). For example, the sensor data 112A can include stereo image pairs 112AA, with each stereo image pair 112AA including a "primary" image and a "secondary" image. As discussed above, the disparity map(s) 112C can include a set of depth information calculated (e.g., by the processor 114) based on correlations between points within stereo images of stereo image pairs such as the stereo image pairs 112AA. The distance data 112D can include data representing distances travelled by the vehicle 100A between stereo image pairs 112AA and/or between timestamps of interest, for example as calculated (e.g., by the processor 114) based on one or more of the GPS/GNSS data 112B, the sensor data 112A, or one or more odometers of the vehicle 100A. The corrections 112E can include one or more corrections to coordinate values (e.g., depth values) of one or more of the disparity map(s) 112C. Alternatively or in addition, in some instances, the corrections 112E can be interpreted or represented as improvements to prior estimates of the relative camera angles (e.g., as part of the calibration) between primary and secondary cameras in the stereo camera rig. The static features 112F can include data associated with or describing objects within an environment of the vehicle 100A, the objects being "static" in that they are stationary/not moving (e.g., traffic signals, signs, trees, bridges, barriers, parked vehicles, etc.). The feature matching algorithm(s) 112G can include, for example, feature detection and description algorithms such as KAZE, AKAZE, Oriented FAST and rotated BRIEF (ORB), BRISK, SIFT, and SURF.

As also shown in FIG. 1, the stereo imagery processing system 110 can be in wireless communication with one or more of: satellite(s) 120, one or more other vehicles (e.g., autonomous vehicle(s)) 100B, and remote compute device(s) 130. For example, the stereo imagery processing system 110 can receive the GPS/GNSS data 120 from the satellite(s) 120 (and/or from the one or more other vehicles 100B and/or the remote compute device(s) 130). Alternatively or in addition, the stereo imagery processing system 110 can send and/or receive corrections 112E to/from the one or more other vehicles 100B and/or the remote compute device(s) 130.

Figure 2:
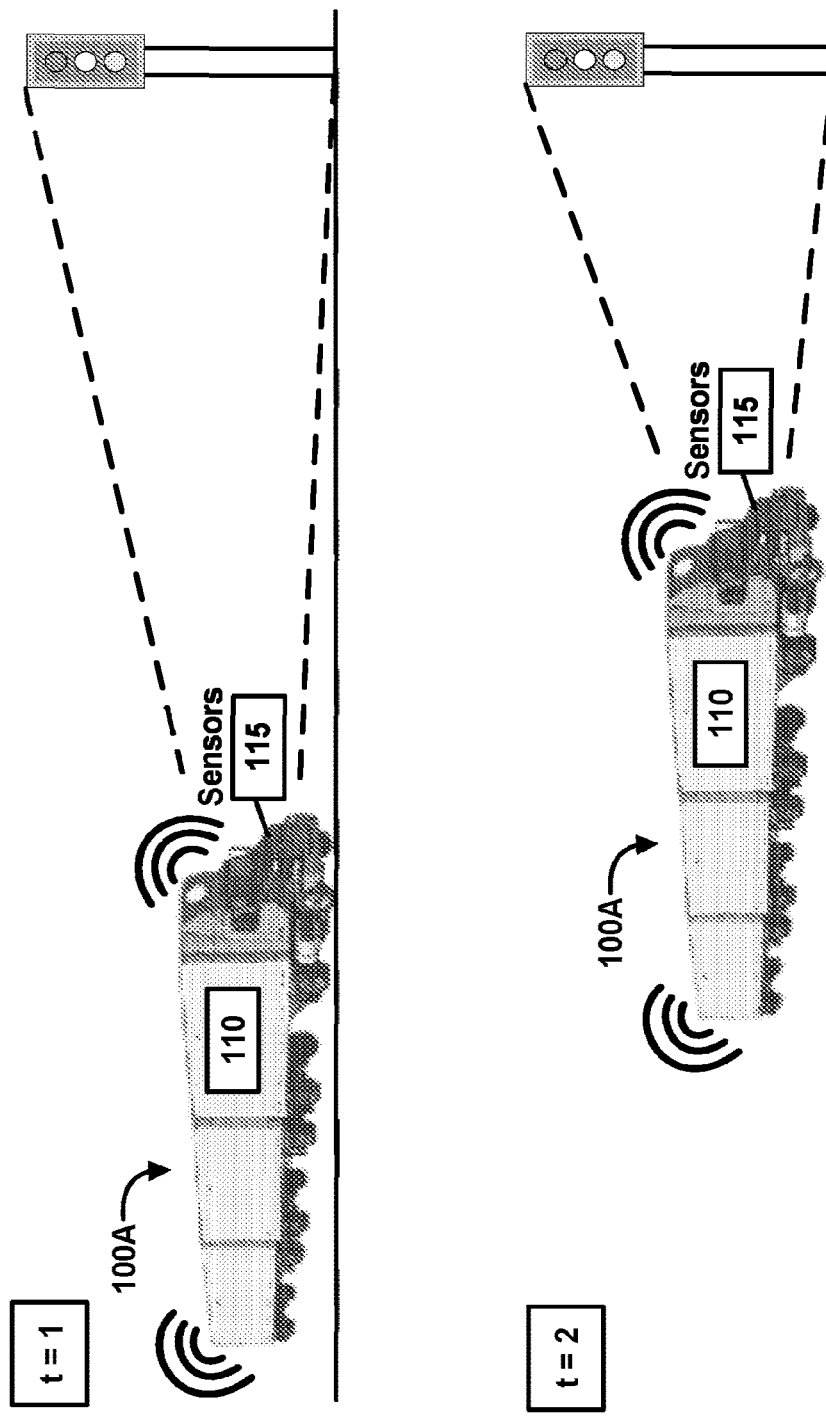
FIG. 2 is a diagram showing a vehicle capturing imagery of a fixed object at two different points in time while travelling, according to some embodiments.

FIG. 2 is a diagram showing a vehicle capturing imagery of a fixed object at two different points in time while traveling, according to some embodiments. As shown in the example of FIG. 2, the fixed object can be a traffic light that the vehicle is driving towards. At a first time (t=1), a first stereo image of the traffic light may be captured by the sensors 115 of the vehicle 100A. At a second, subsequent time (t=2), a second stereo image of the traffic light may be captured by the sensors 115 of the vehicle 100A, with the vehicle closer to the traffic light at the second time than at the first time. A correspondence between the two stereo images can then be determined, and the stereo image data combined with ego motion data to determine a correction to a disparity map. When implementing motion-based stereo calibration refinement methods described herein, such correspondences should be determined over a sufficiently large distance that the ego motion accuracy exceeds/dominates the stereo accuracy. Generating such correspondences can be performed, for example, using feature-based matching or via dense matching, each discussed in turn below.

Figure 3:
FIG. 3 is an example image comparison showing a feature matching based on signage, according to some embodiments.
Figure 4:
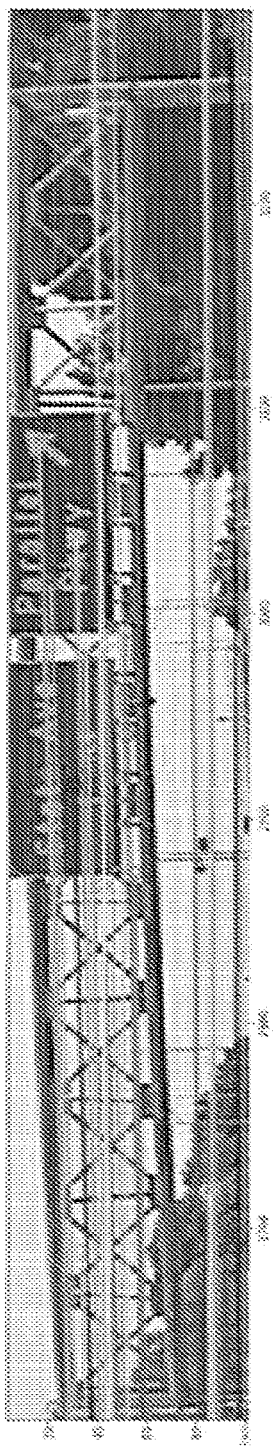
FIG. 4 is a zoomed-in view of the feature matching of FIG. 3.

In general, two challenges exist with feature-based matching. First, the calculation of image features (e.g., using algorithms such as AKAZE and SIFT) uses significant central processing unit (CPU) and/or graphics processing unit (GPU) resources (i.e., is computationally expensive), with better quality (e.g., more discriminative or repeatable) features often taking longer to calculate, and in real-time or low-latency systems such processing costs can be prohibitively high. Second, long-range feature matching can be challenging, in that some algorithms (e.g., SIFT) are more accurate than others, and can nevertheless produce relatively fewer matches than might be desirable. An example of a sign matching between two frames (the sign being closer in the righthand image than in the lefthand image) using a RootSIFT algorithm after a vehicle has travelled about 70 meters is shown in FIG. 3, and a zoomed-in view of the sign in the righthand image of FIG. 3 is shown in FIG. 4 (with correspondences represented by substantially horizontal lines). As can be seen in FIG. 4, relatively few matches are identified, which makes the data more prone to noise. In total, the best feature matching setting for this image pair produced 182 matches. Note that, although depicted in FIG. 3 as being "lefthand" and "righthand" images, as discussed above, stereo image pairs generally include a "primary" image and a "secondary" image, which are not necessarily horizontally aligned. For example, a vertical arrangement ("vertical stereo") is also contemplated.

In some embodiments, for a dense matching approach, ego-motion data can be used to overlay two or more disparity maps calculated as part of the stereo data calibration. The expected motion of a stereo camera can be represented as a 6-degree of freedom (6dof) rigid body transform (e.g., the SE(3) transformation) by combining data from the associated vehicle's inertial navigation system (GPS+IMU) with the known extrinsic transform between the stereo camera and the IMU (e.g., the vehicle mounting location) in an algorithmic approach, optionally with filtering and/or averaging over time. Since image pixels having a disparity value are 3D points, the ego motion and the known camera matrix can be used to re-project the image pixels into the other image. As used herein, "reprojection" refers to transforming 3D stereo data generated after a vehicle has moved using the inverse of the ego motion and the camera matrix, to generate new two-dimensional (2D) points that approximate an image taken before the vehicle moved.

Figure 5:
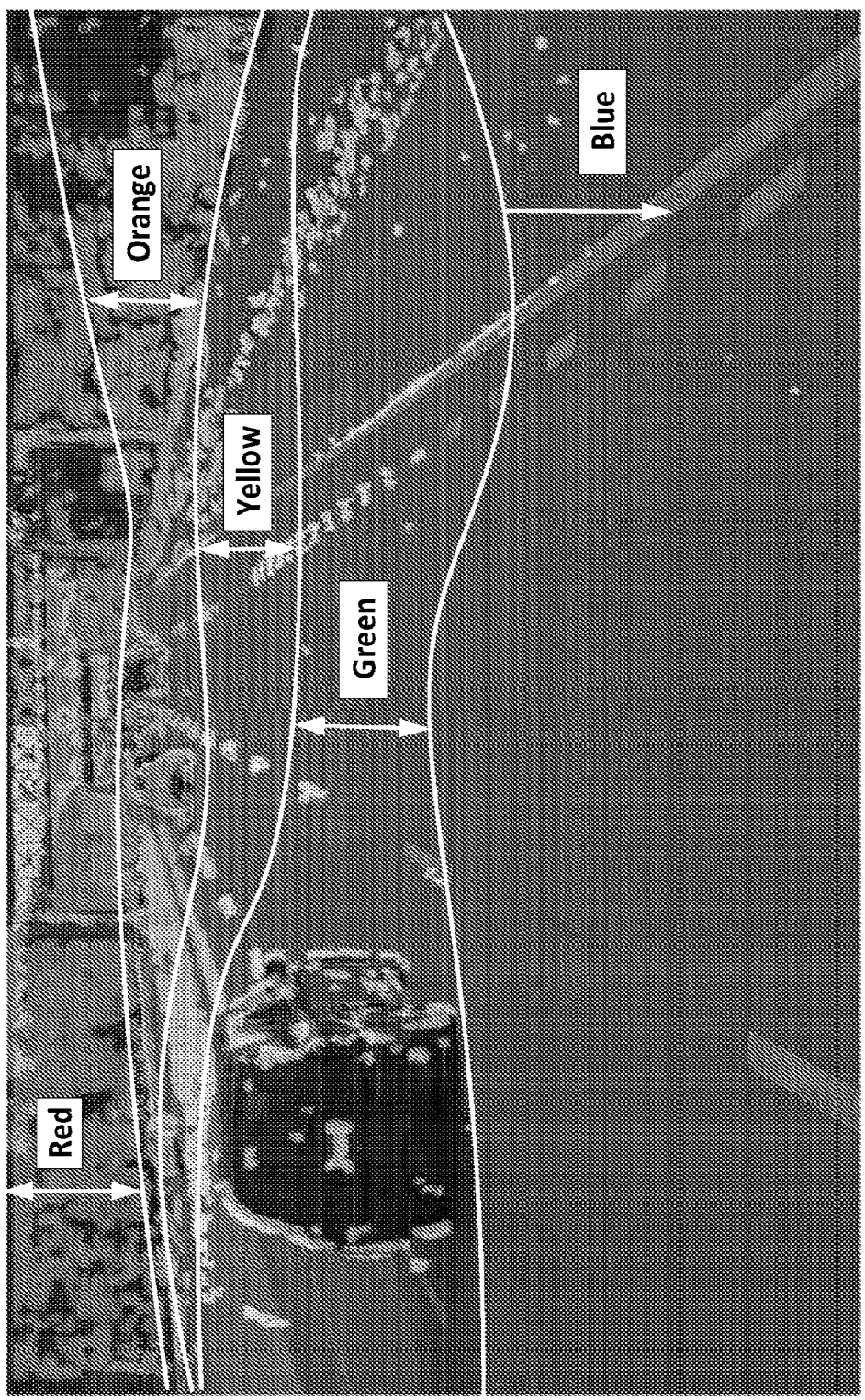
FIG. 5 is an example dense disparity map, according to an embodiment.

FIG. 5 is an example visualization of a dense disparity map, according to an embodiment, for a vehicle that has driven 70 meters towards the depicted sign. To generate the visualization, an image from a primary camera was transformed to greyscale, and then valid disparities were drawn on the greyscale as colored points. The color labels refer to the color of the points depicted in each band, with different colors representing different depths. Where no colored points appear, disparities may have been filtered out as unreliable.

Color images on a computer are typically represented as an array of red, green, and blue (r/g/b) intensity values. As such, a "pixel" or picture element can include or be represented by a triplet of numbers—one for each color channel. In a 24-bit image, for example, one byte may be used to represent each color—e.g., (255, 255, 255) can refer to white, and (0, 0, 0) can refer to black. Consider two images as inputs to a visualization, where "I0" is an original image from time 0 (see left pane of FIG. 3), "I1" is an image from time 1 (i.e., 2.7 seconds after time 0 in this case—see FIG. 6), and "S" is a synthetic image (see FIG. 7) generated by reprojecting the stereo data from time 1 to the estimated pose at time 0. Both of images I0 and I1 have the same dimensions, and due to the 3D position estimates for the valid disparity pixels and approximately known ego-motion, both images are expected to have similar RGB values. The visualization of FIG. 7 shows the similarity achieved by the synthetic image generation process. Each pixel in the visualization of FIG. 7 is a combination of pixels in I0 and I1. If x and y are used for the image coordinates, and r/g/b are used for the color channels, then each pixel in the visualization image "V" an be written as:

$$V[y,x,r]=I0[y,x,r]$$

$$V[y,x,g]=I1[y,x,g]$$

$$V[y,x,b]=0.5*I0[y,x,b]+0.5*I1[y,x,b]$$

Since I0 is a real image, the red channel is valid everywhere. I1, on the other hand, is sparse, so the green channel is missing (0) at many pixels in V, and the blue channel is darkened at many pixels in V. The only pixels in V that appear to have normal color are those cases where the synthetic image I1 matches the original image I0 well.

Figure 6:
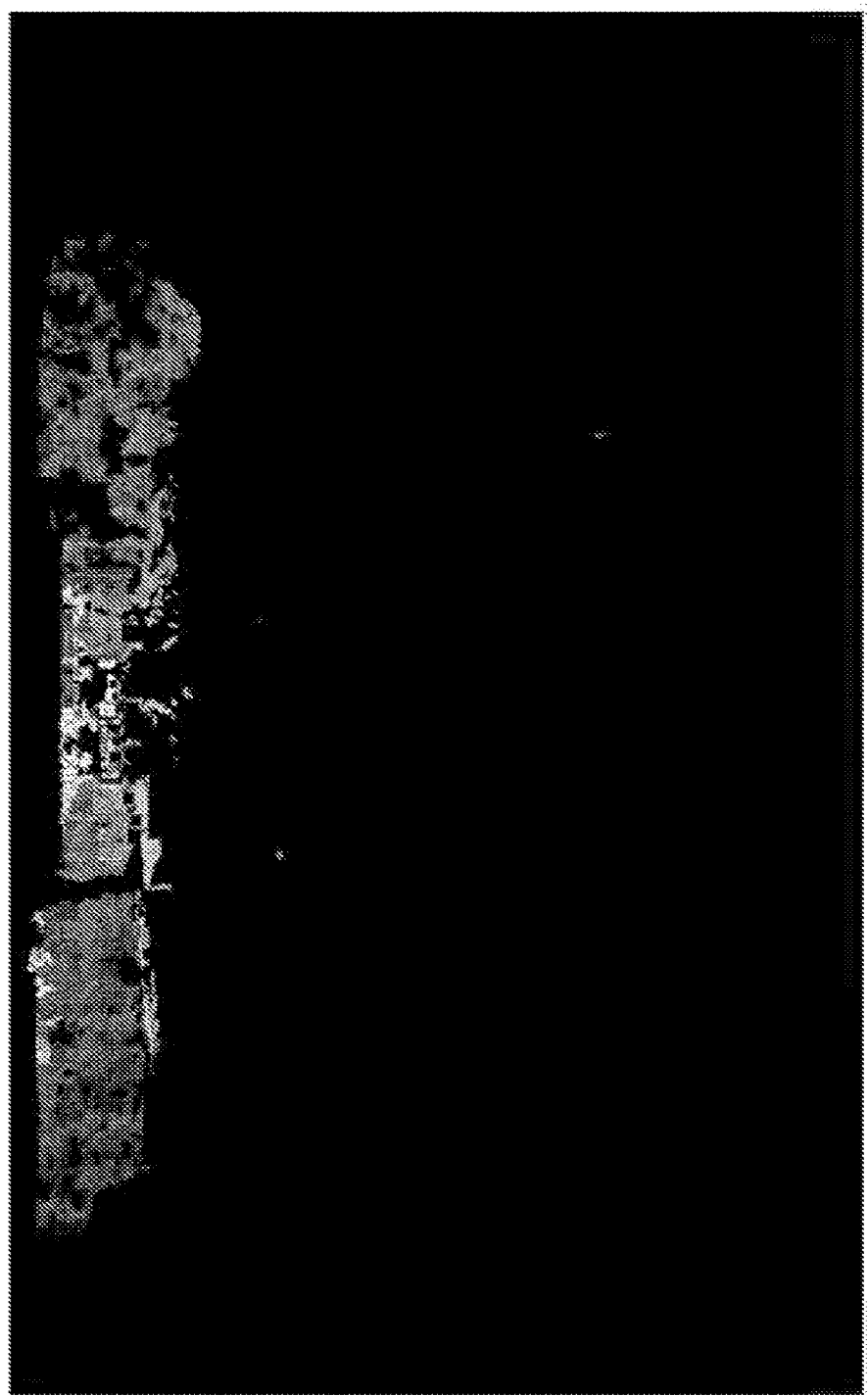
FIG. 6 shows a reprojection of three-dimensional (3D) stereo data, with dynamic obstacles masked, according to an embodiment.
Figure 7:
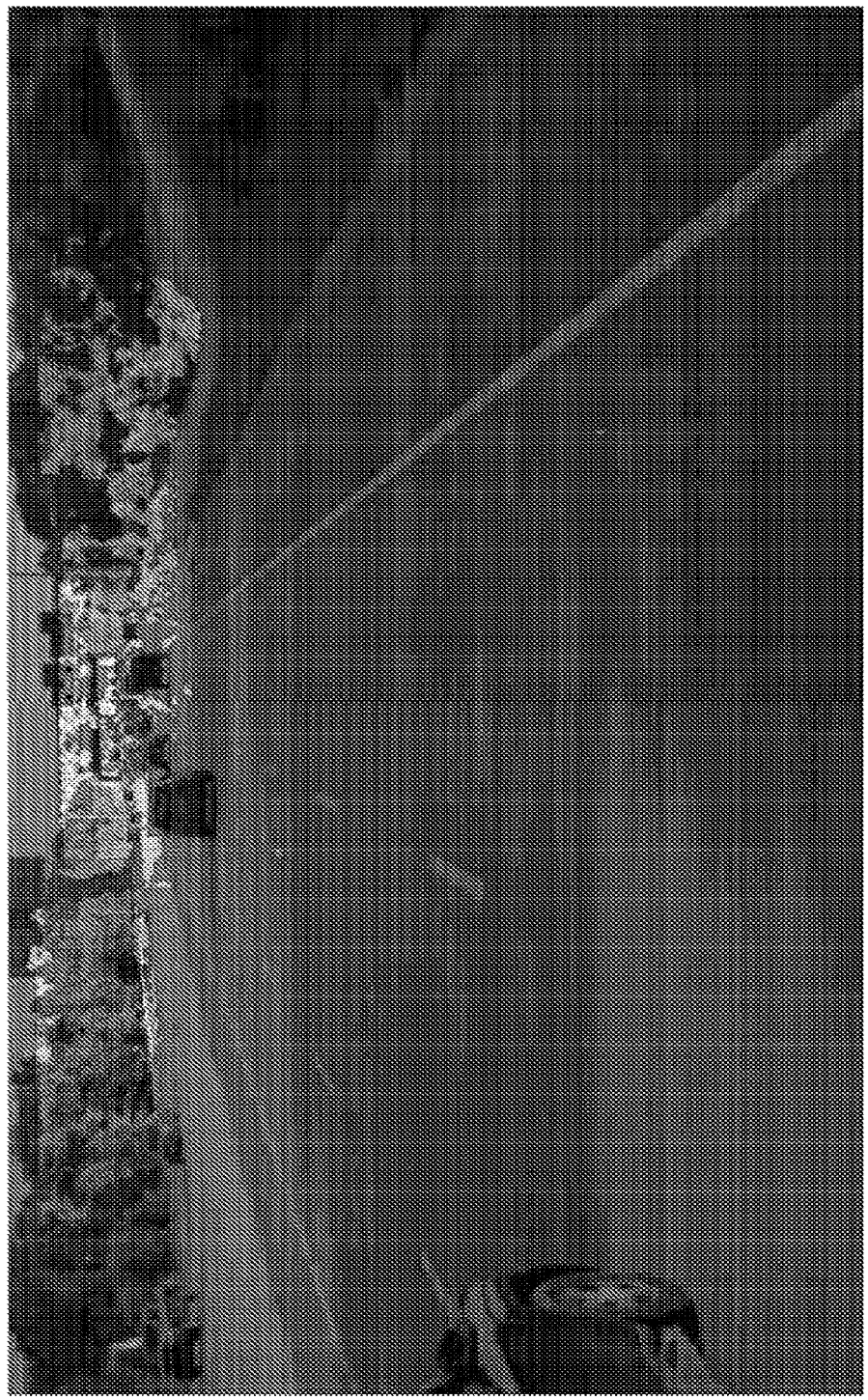
FIG. 7 shows a reprojection of a 3D stereo image taken after a vehicle has moved, onto a 3D stereo image taken before the vehicle moved, according to an embodiment.

FIG. 6 is a synthetic image showing a reprojection of three-dimensional (3D) stereo data (i.e., of an original image), with dynamic obstacles masked, according to an embodiment. A reasonable match was obtained (red channel is from the more distant image, i.e., first frame, green channel is the reprojections from 2.7 seconds later, and the blue channel is an average of both frames). FIG. 7 shows a reprojection of a 3D stereo image taken after a vehicle has moved, onto a 3D stereo image taken before the vehicle moved (i.e., the synthetic image of FIG. 6 overlaid on the original image), according to an embodiment.

The noise exhibited in dense matching can be from one of multiple sources, including pose noise and depth errors.

Disparities at common/corresponding locations in each of the synthetic image (FIG. 6) and the original image (left pane of FIG. 3) can be subtracted to obtain disparity errors. In the case of FIGS. 5-7, 116,222 correspondences have a valid disparity and are not located on a vehicle.

Figure 8:
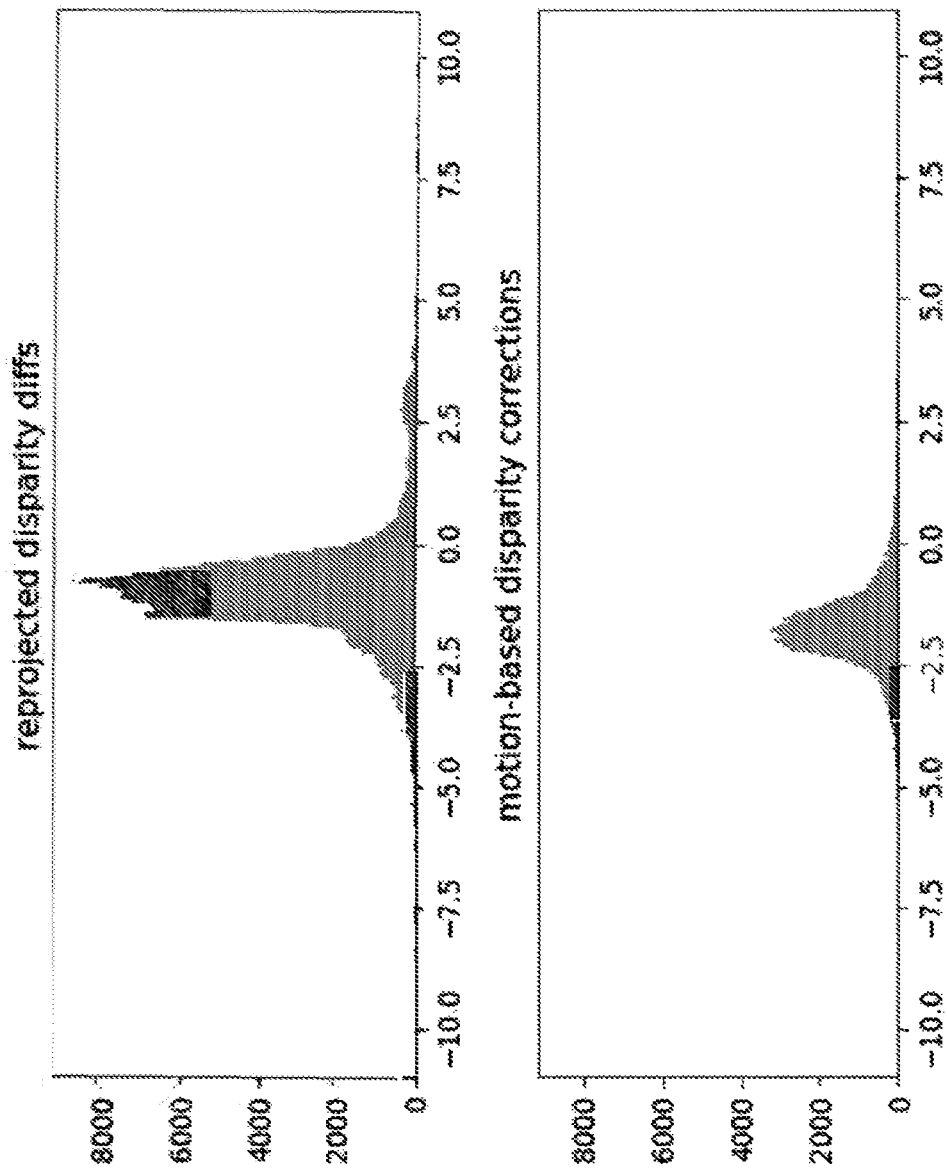
FIG. 8 shows differences between disparities associated with common pixel locations, between a synthetic image (top) and an original image (bottom), according to an embodiment.
Figure 9:
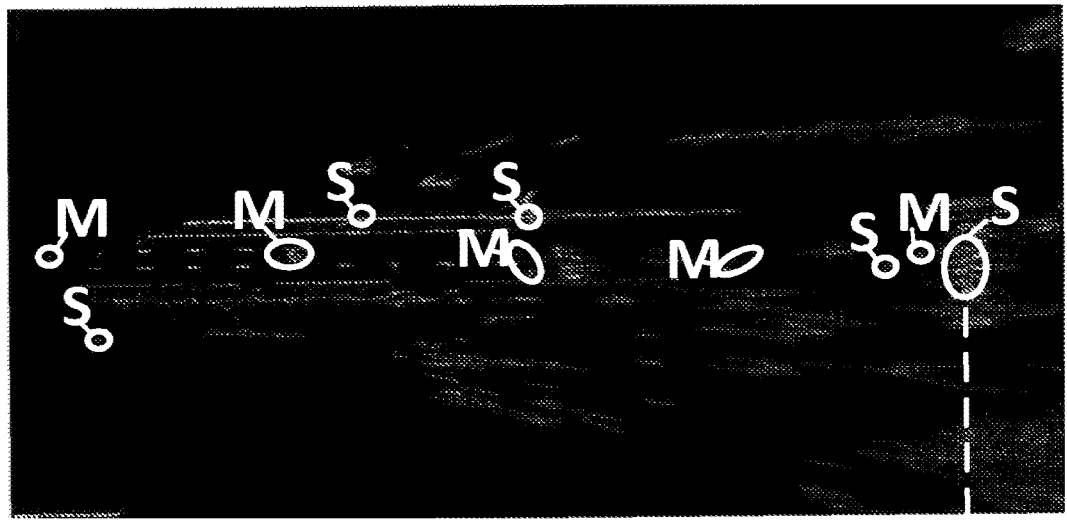
FIG. 9 is a "before" image of the scene of FIG. 8, showing radar data and stereo image data, according to an embodiment.
Figure 10:
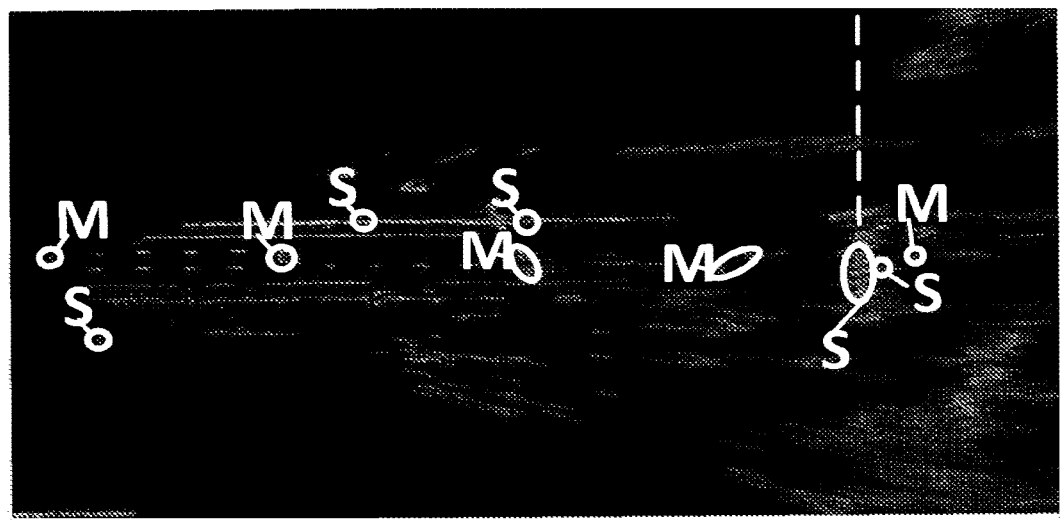
FIG. 10 in an "after" image, after performing a disparity correction on the image of FIG. 9, in accordance with methods disclosed herein.

The disparity differences between the synthetic image and the original image and the motion-based disparity corrections are represented in FIGS. 8-10 and 11-13, for two different calibrations. FIG. 8 shows histograms representing differences between disparities associated with common pixel locations, between a synthetic image (top) and an original image (bottom), according to an embodiment. The y-axis represents the number of pixels having the same difference/disparity value, and the x-axis represents the difference in pixel units. FIG. 9 is a "before" birds-eye view image of the scene of FIG. 8, showing radar data and stereo image data, according to an embodiment. FIG. 10 in an "after" birds-eye view image, after performing a disparity correction on the image of FIG. 9, in accordance with methods disclosed herein. The disparity correction can constitute a correction of an estimate of relative rotation between the primary and secondary cameras in the epipolar plane (also referred to herein as "yaw"). Radar tracks are shown in FIGS. 9-10, for reference, with circled regions marked "S" representing stopped/stationary features, and with circled regions marked "M" representing features that are moving/in motion. As can be seen in FIGS. 9-10, the stereo-detected obstacles/objects coincide much better with the radar tracks in FIG. 10, as contrasted with FIG. 9.

Figure 11:
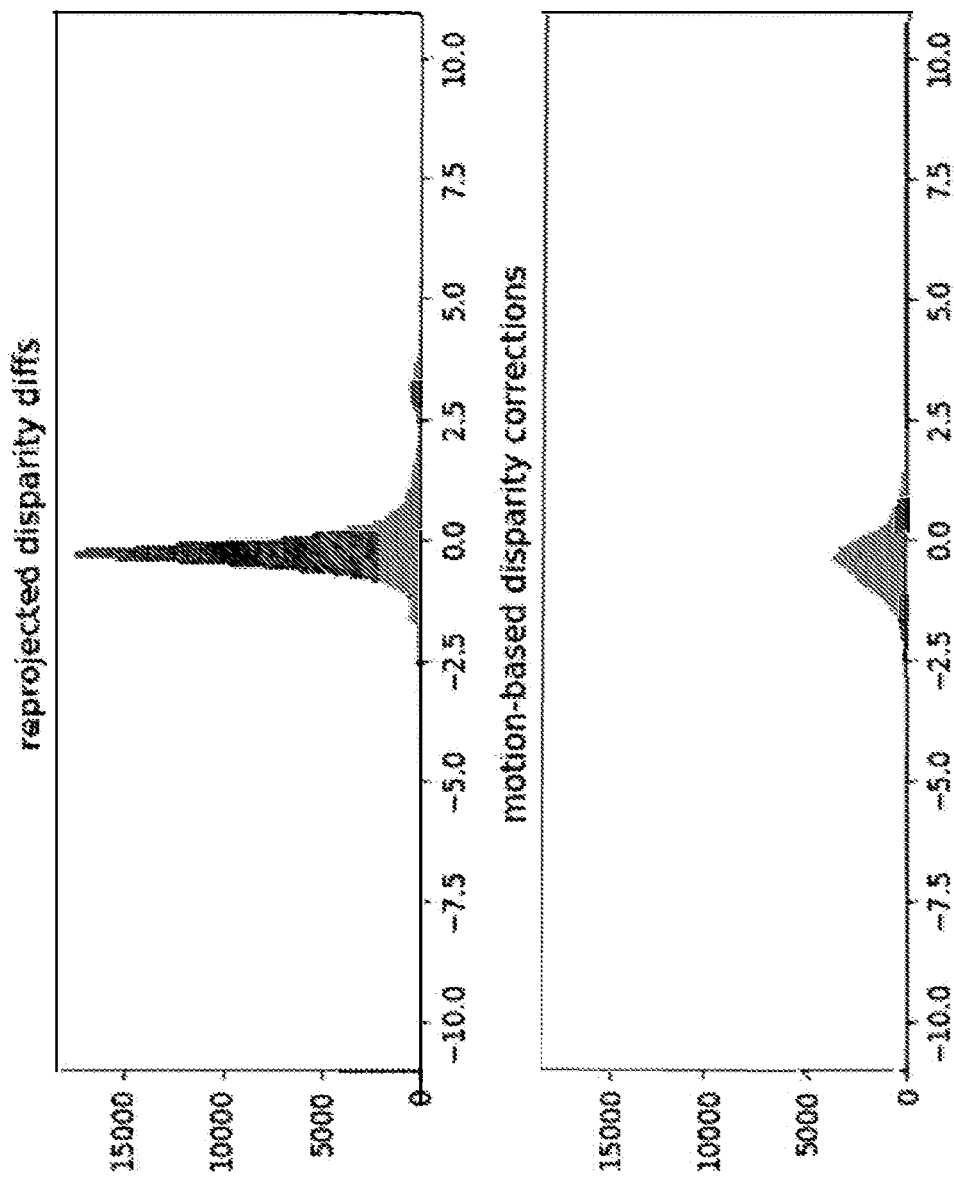
FIG. 11 shows a second set of plots of: disparity differences between a synthetic image of a scene and an associated stereo image of the scene for a first calibration (top), and motion-based disparity corrections for a second calibration for the scene (bottom).
Figure 12:
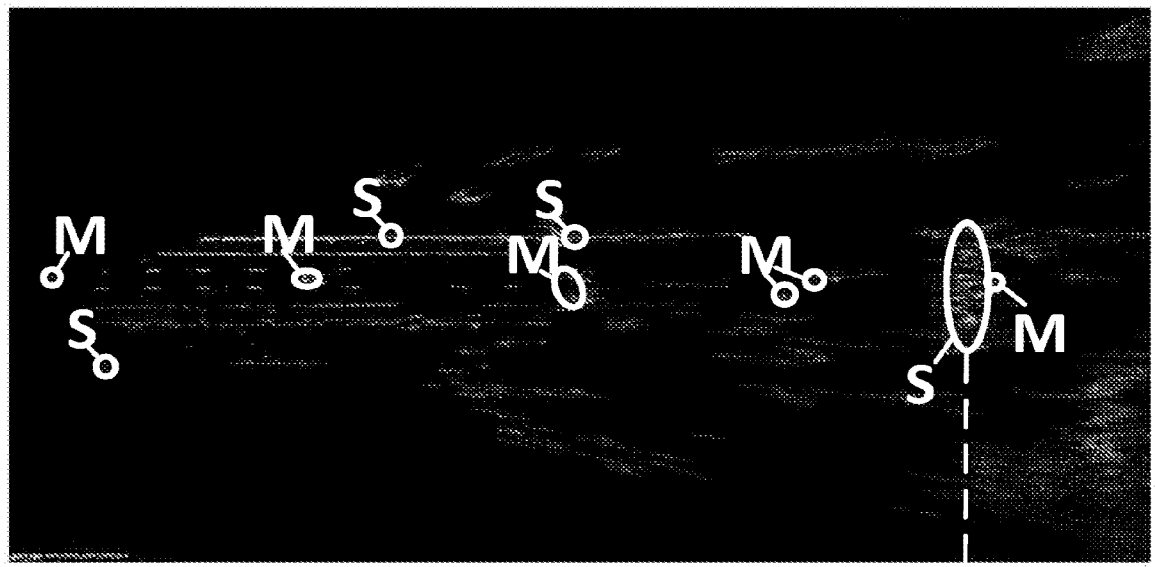
FIG. 12 is a "before" image of the scene of FIG. 11, showing radar data and stereo image data, according to an embodiment.
Figure 13:
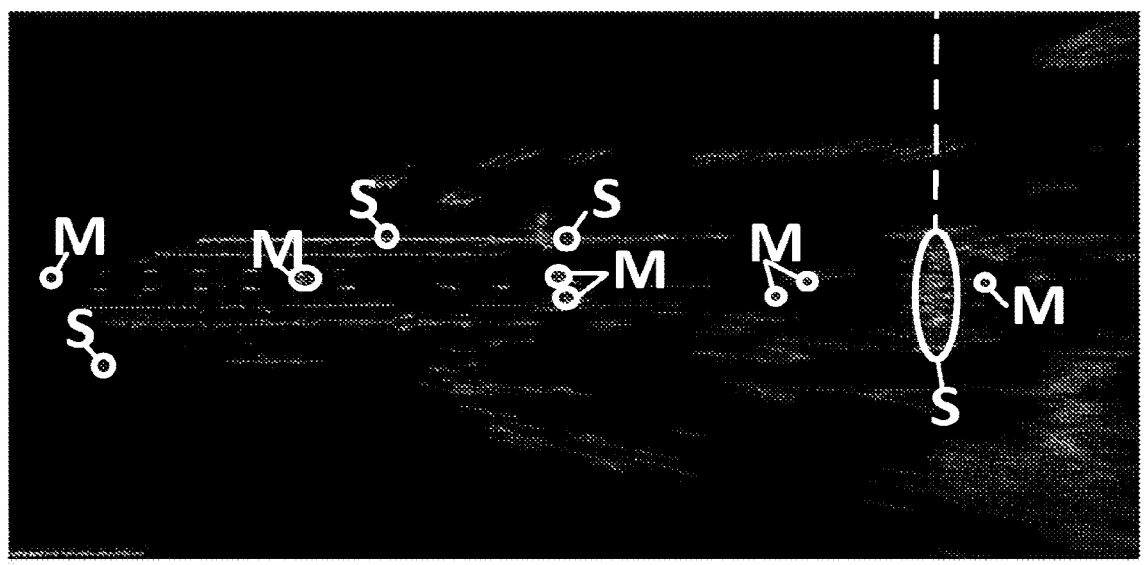
FIG. 13 is an "after" image, after performing a disparity correction on the image of FIG. 12, in accordance with methods disclosed herein.
Figure 14:
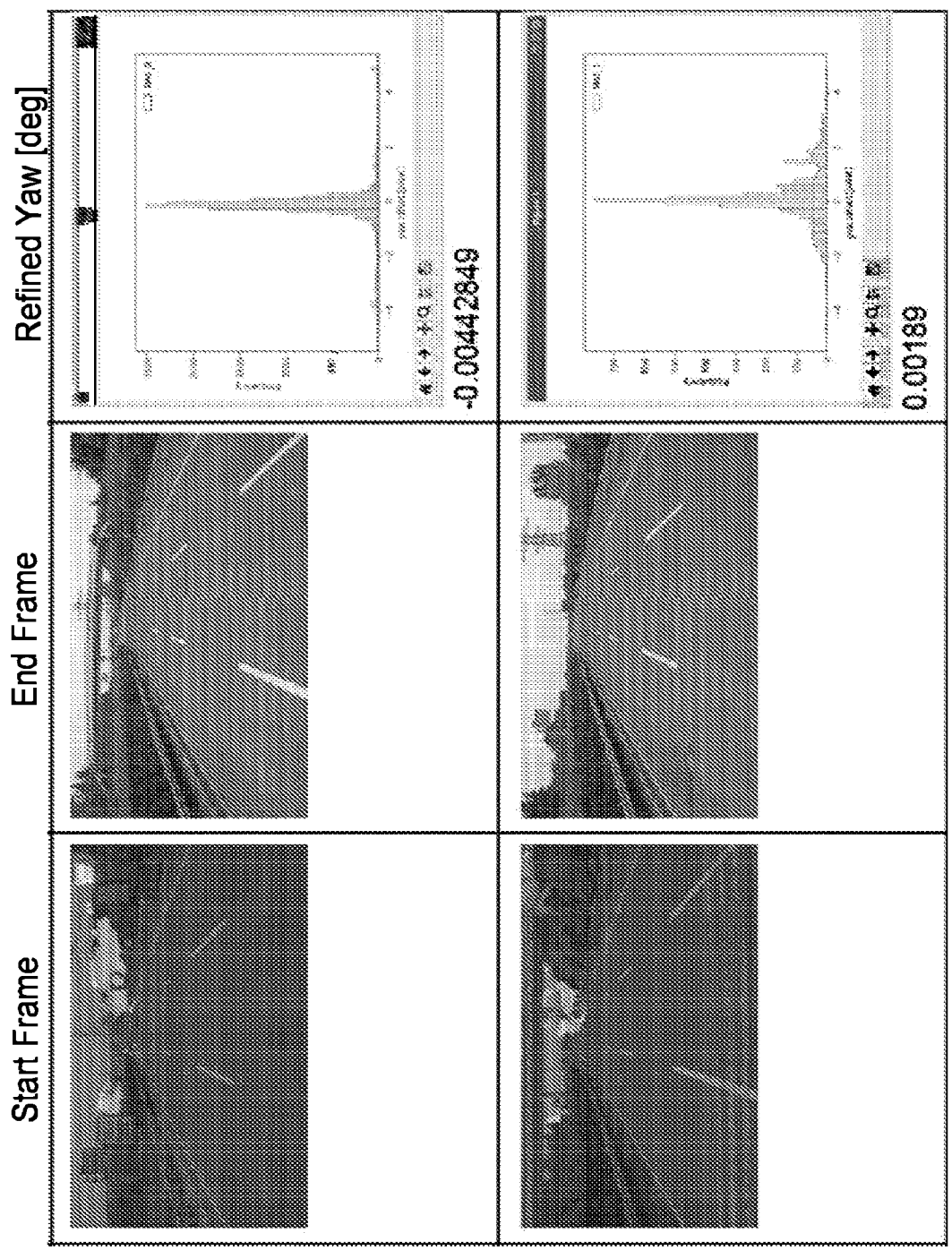
FIGS. 14 through 17 show start frames, end frames, and refined yaw values for a yaw refinement consistency test performed for a vehicle, according to an embodiment.
Figure 15:
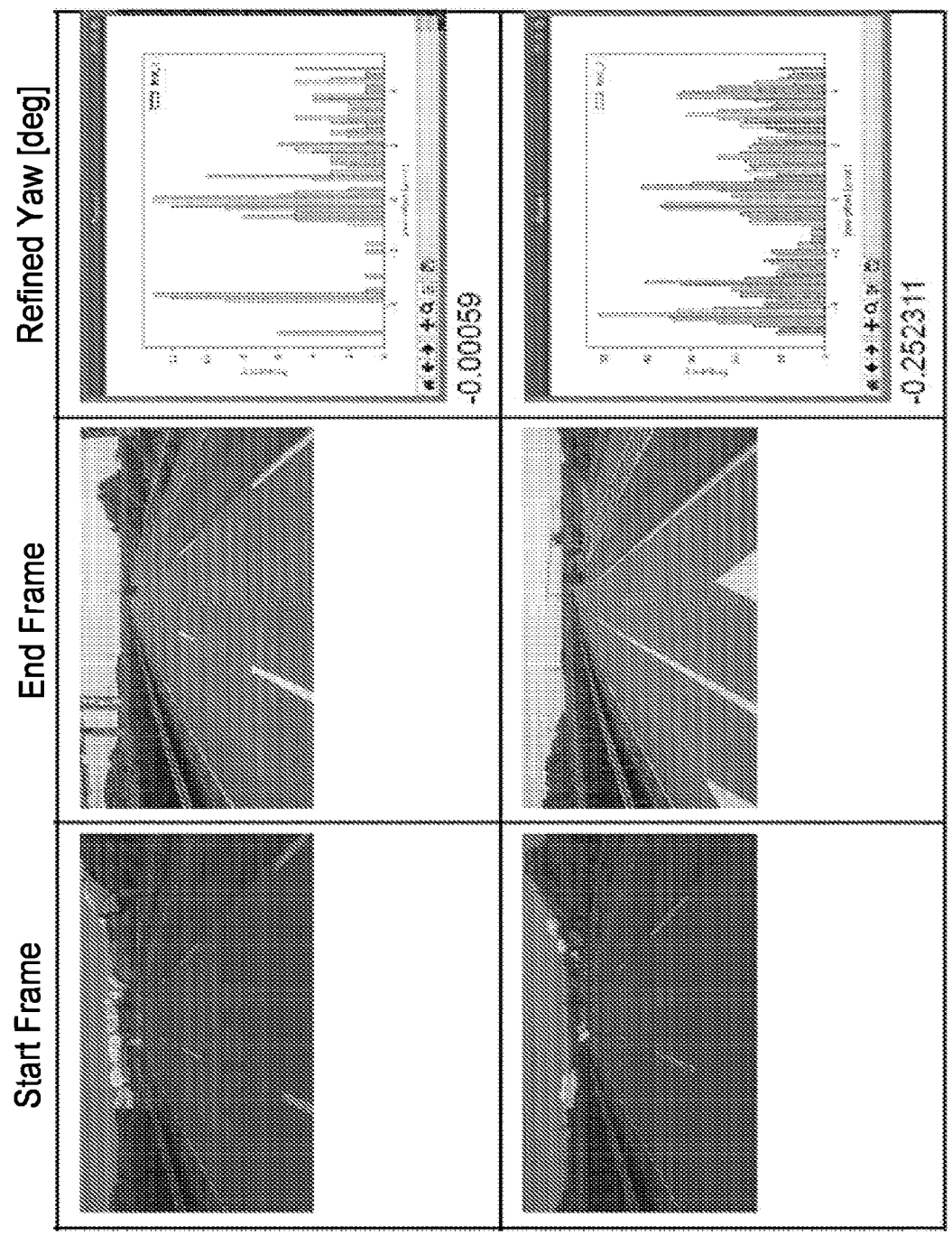
Figure 16:
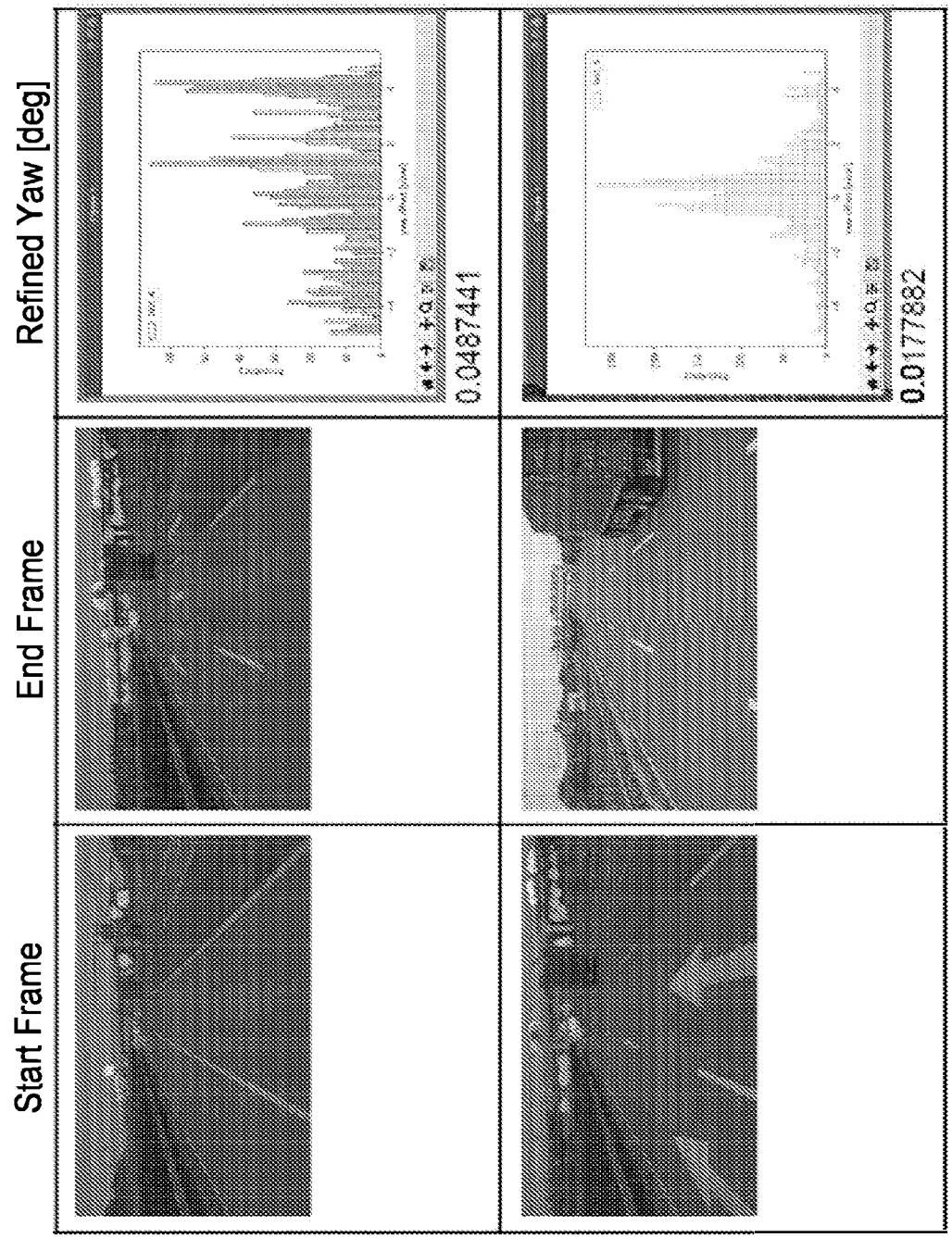
Figure 17:
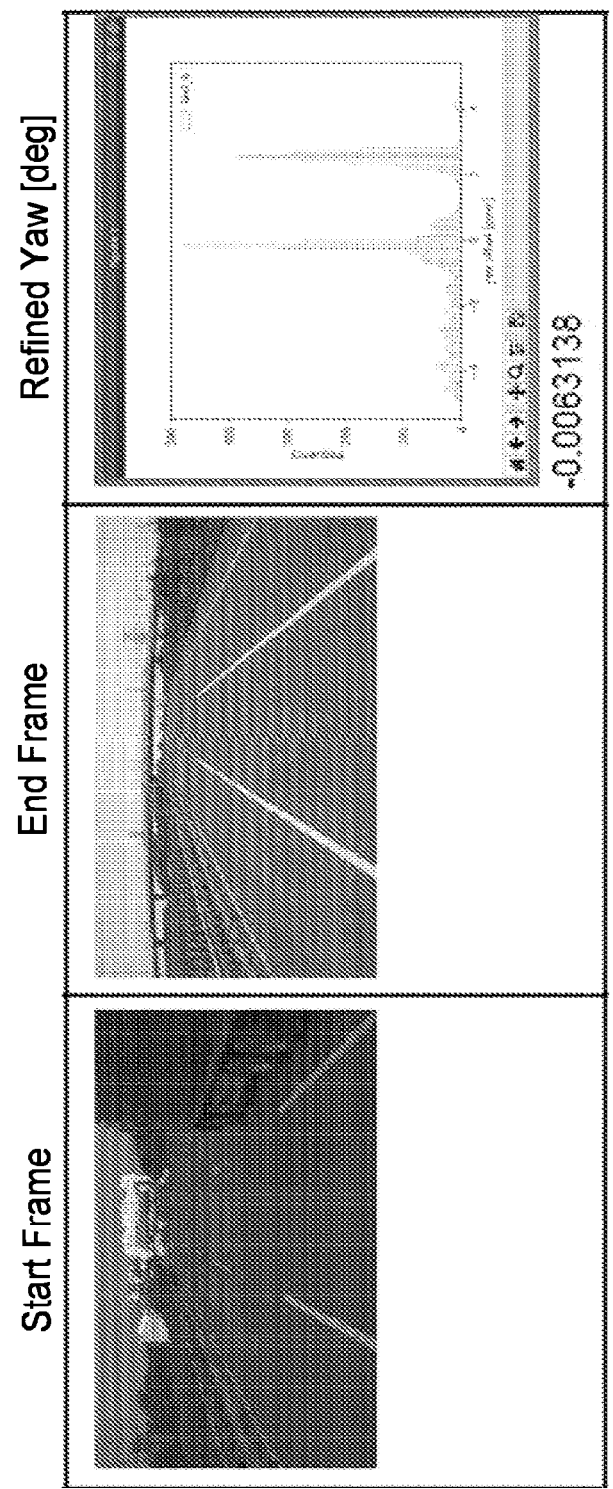

FIG. 11 shows a second set of plots of: disparity differences between a synthetic image of a scene and an associated stereo image of the scene for a first calibration (top), and motion-based disparity corrections for a second calibration for the scene (bottom), for an autonomous truck. FIG. 12 is a "before" image of the scene of FIG. 11, showing radar data and stereo image data, according to an embodiment. FIG. 13 is an "after" image, after performing a disparity correction on the image of FIG. 12, in accordance with methods disclosed herein. Here again, radar tracks are shown in FIGS. 12-13, with circled regions marked "S" representing stopped/stationary features, and with circled regions marked "M" representing features that are moving/in motion.

In some embodiments, further corrections to disparity-corrected data generated by systems and methods described herein may be desired. For example, a correction may be desired to address multi-modal correction density, which may be caused, for example, by occlusions in the scene. Alternatively or in addition, a correction may be desired to address low-overlap or sparse disparity. Alternatively or in addition, a correction may be desired to address ego-motion estimation bias, which can cause poor matching or involve extensive registration. Alternatively or in addition, a correction may be desired to address a situation in which there is a large number of dynamic obstacles in the scene obscuring static features.

In some embodiments, a test may be performed to check a yaw refinement consistency for a given vehicle.

Figure 18:
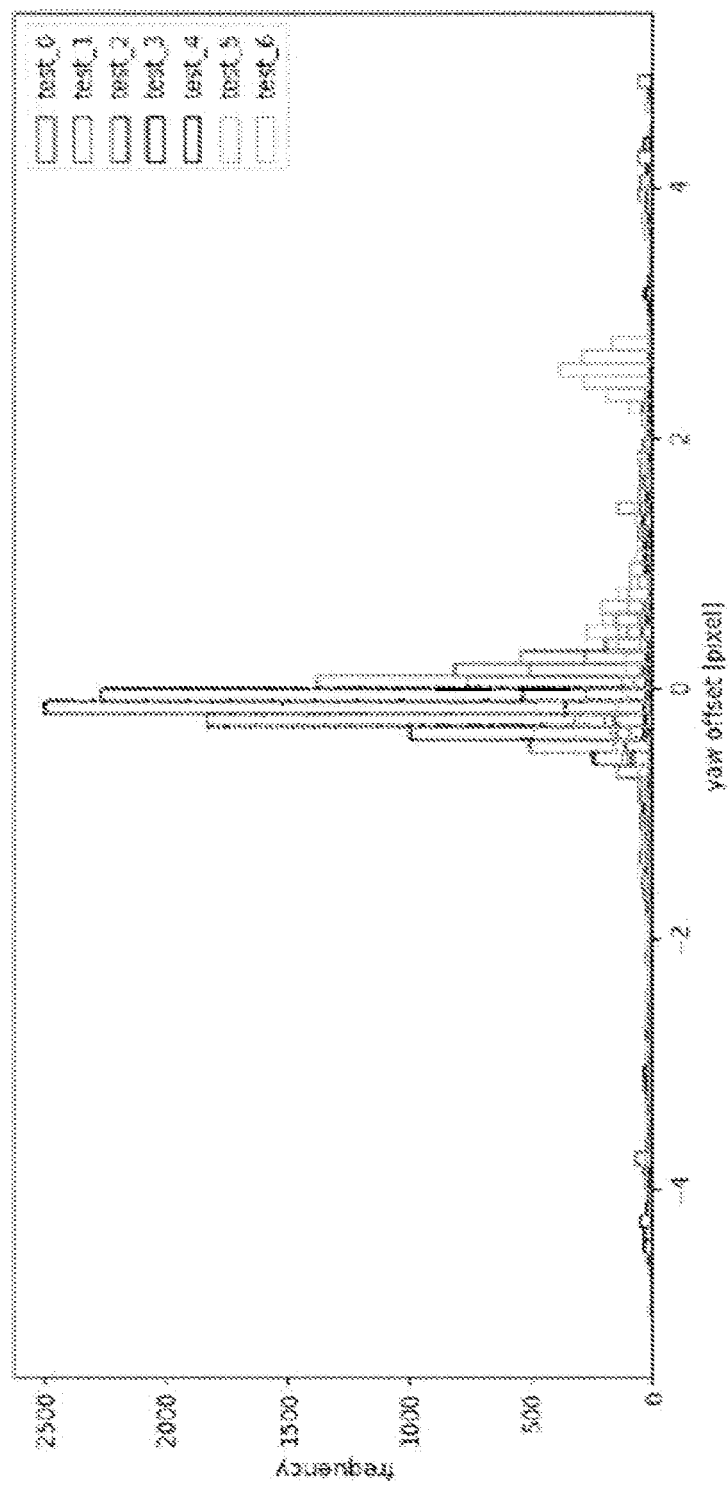
FIG. 18 is a plot combining the refined yaw values of FIGS. 14-17.

FIGS. 14 through 17 show start frames, end frames, and refined yaw values for a yaw refinement consistency test performed for a vehicle, according to an embodiment. FIG. 18 is a plot combining the refined yaw values of FIGS. 14-17 and showing their alignment with one another.

In some embodiments, a failure analysis/detection (and optional correction/remediation) can be performed in response to detecting a failure scenario. A failure scenario (or "failure case") can arise, for example, whereby repeated structures in an image, together with inaccuracies in reprojection, lead to many votes for a correction that would worsen the depth accuracy. Alternatively, a failure scenario can arise if a given disparity map is too sparse, such that relevant portions of an image for correction (e.g., static objects at a sufficient distance) may not be reflected in the data at all. These failure cases can be mitigated/remediated by ignoring image pairs that provide too few correction datapoints, or where the variance of the correction distribution from a single frame is too high (e.g., exceeds a predefined threshold value). If the dynamics of the camera head movement are understood, it is possible to filter the corrections over time, e.g., with a low-pass filter, to reject noise. Repeated or misleading structures in the environment can be noted a priori using a map, or handled using optical flow or a tracking algorithm to establish that the objects in the initial frame have gone out of the field of view.

Figure 19:
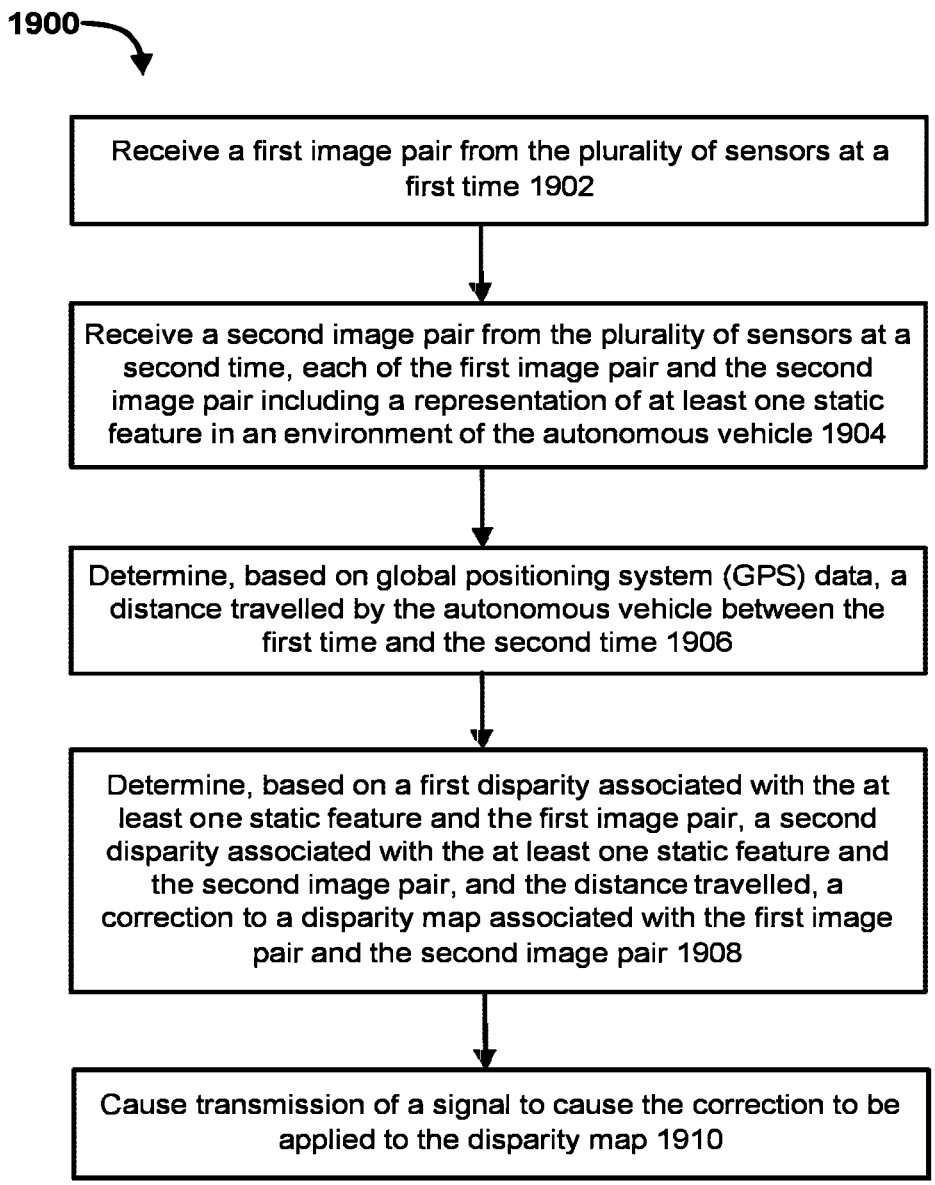
FIG. 19 is a flow diagram of a first processor-implemented method for image calibration, in accordance with some embodiments.

FIG. 19 is a flow diagram of a first processor-implemented method (1900) for image calibration, in accordance with some embodiments. The method 1900 can be performed on a system that includes sensors onboard a vehicle, a processor, and a memory, for example as shown and described with reference to FIG. 1. The memory can store instructions to cause the processor to perform the method 1900. As shown in FIG. 19, the method 1900 includes receiving, at 1902, a first image pair from the sensors at a first time, and receiving, at 1904, a second image pair from the sensors at a second time. Each of the first image pair and the second image pair includes a representation of at least one static feature in an environment of the vehicle. The method 1900 also includes determining, at 1906, based on global positioning system (GPS) data (and/or based on loop closure data and/or data from one or more other satellite systems (e.g., Glonass, Galileo, etc.), a distance travelled by the vehicle between the first and second times, and determining, at 1908, a correction to a disparity map based on (1) a first disparity associated with the at least one static feature and the first image pair, (2) a second disparity associated with the at least one static feature and the second image pair, and (3) the distance travelled. The method 1900 also includes causing transmission, at 1910, of a signal to cause the correction to be applied to the disparity map. The signal may be transmitted, for example, to one or more remote compute devices (e.g., remote compute device(s) 130 in FIG. 1) storing a copy of the disparity map, and the one or more remote compute devices may update the copy of the disparity map based on the correction to the disparity map, to produce an updated disparity map. The updated disparity map can include, for example, increased accuracy depth information relative to the pre-update version of the disparity map.

In some implementations, the first image pair is received at 1902 while the vehicle is in motion and second image pair is received at 1904 while the vehicle is in motion.

In some implementations, the method 1900 also includes generating the disparity map by determining correspondences between the first image pair and the second image pair. The determination of the correspondences between the first image pair and the second image pair can be performed via feature matching and/or dense matching.

In some implementations, the distance travelled by the vehicle between the first time and the second time is at least about 50 meters.

In some implementations, the correction to the disparity map includes at least one correction to a depth value.

Figure 20:
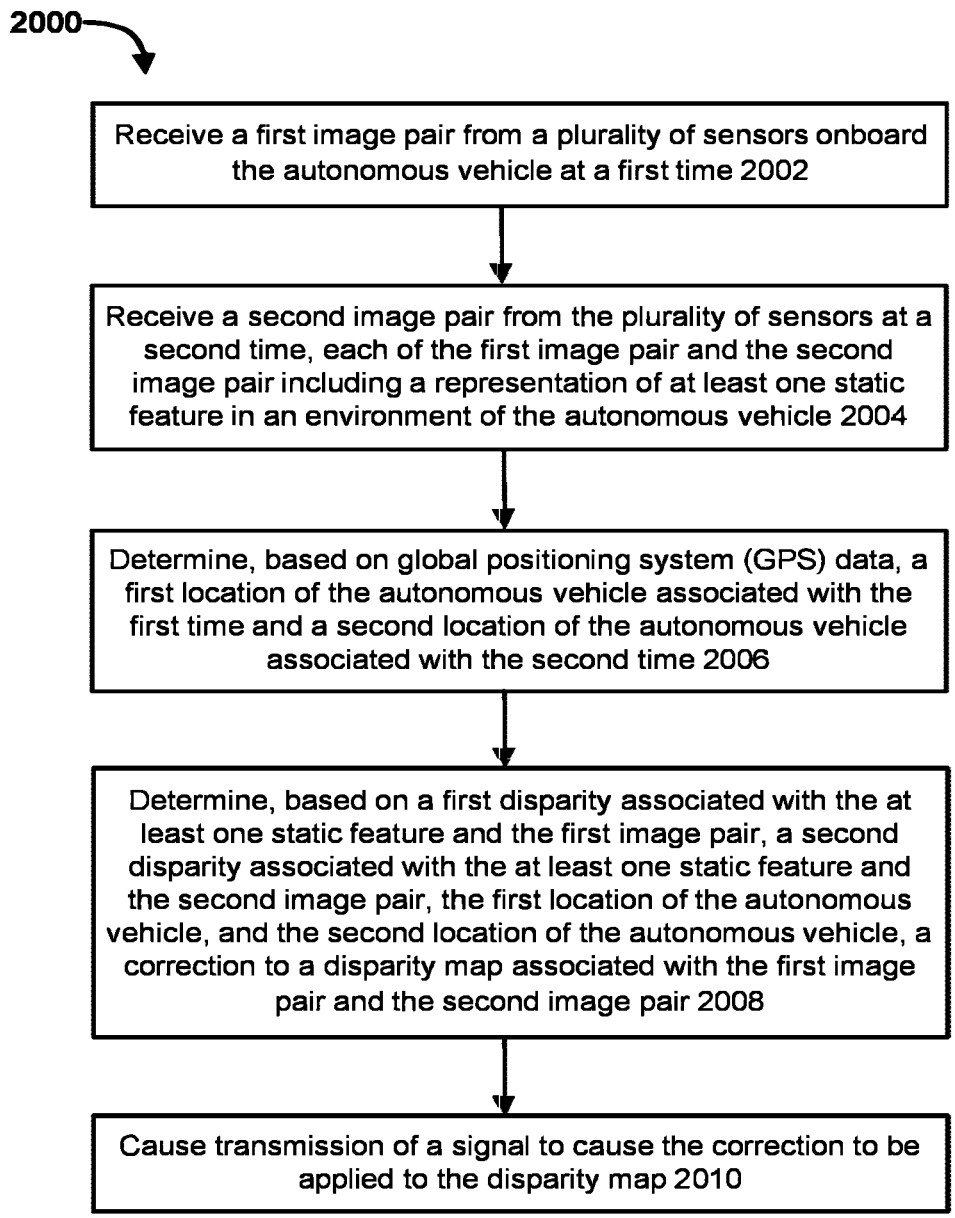
FIG. 20 is a flow diagram of a second processor-implemented method for image calibration, in accordance with some embodiments.

FIG. 20 is a flow diagram of a second processor-implemented method, 2000, for image calibration, in accordance with some embodiments. The method 2000 can be performed by a processor located at or on a vehicle (for example as shown and described with reference to FIG. 1), in accordance with instructions stored in a non-transitory, processor-readable medium. As shown in FIG. 20, the method 2000 includes receiving, at 2002, a first image pair from a plurality of sensors onboard the vehicle at a first time, and receiving, at 2004, a second image pair from the plurality of sensors at a second time. Each of the first image pair and the second image pair can include a representation of at least one static feature in an environment of the vehicle. The method 2000 also includes determining, at 2006 and based on global positioning system (GPS) data (and/or based on loop closure data and/or data from one or more other satellite systems (e.g., Glonass, Galileo, etc.), a first location of the vehicle associated with the first time and a second location of the vehicle associated with the second time. The method 2000 also includes determining, at 2008 and based on (1) a first disparity associated with the at least one static feature and the first image pair, (2) a second disparity associated with the at least one static feature and the second image pair, (3) the first location of the vehicle, and (4) the second location of the vehicle, a correction to a disparity map associated with the first image pair and the second image pair. The method 2000 also includes causing transmission, at 2010, of a signal to cause the correction to be applied to the disparity map.

In some implementations, the method 2000 also includes generating the disparity map by determining correspondences between the first image pair and the second image pair.

In some implementations, the method 2000 also includes correcting the disparity map based on the correction.

In some implementations, the correction to the disparity map is applied while the vehicle is traveling.

In some implementations, the method 2000 also includes generating the disparity map by determining correspondences between the first image pair and the second image pair. The correspondences between the first image pair and the second image pair can be determined via feature matching and/or via dense matching.

In some implementations, the correction to the disparity map includes at least one correction to a depth value.

Figure 21:
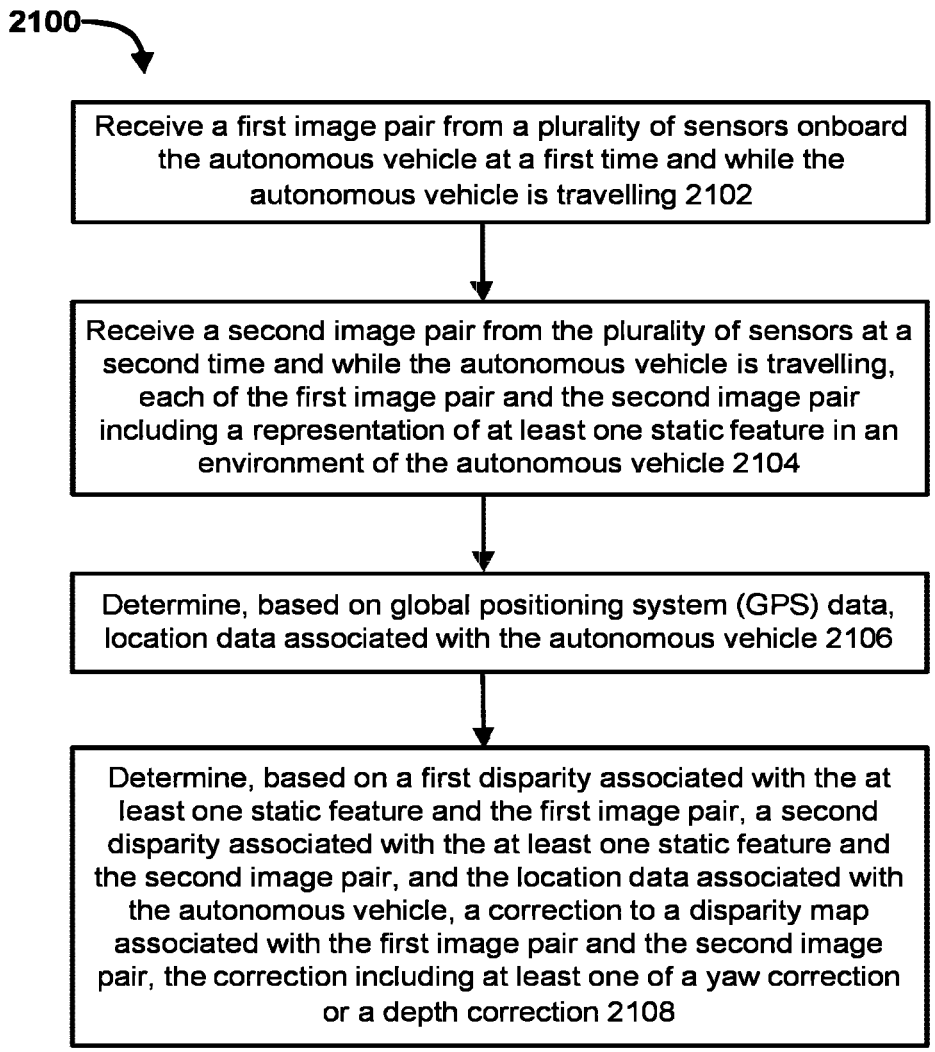
FIG. 21 is a flow diagram of a third processor-implemented method for image calibration, in accordance with some embodiments.

FIG. 21 is a flow diagram of a third processor-implemented method 2100 for image calibration, in accordance with some embodiments. The method 2100 can be performed by a processor located at or on a vehicle (for example as shown and described with reference to FIG. 1), in accordance with instructions stored in a non-transitory, processor-readable medium. As shown in FIG. 21, the method 2100 includes receiving, at 2102, a first image pair from a plurality of sensors onboard the vehicle at a first time and while the vehicle is travelling, and receiving, at 2104, a second image pair from the plurality of sensors at a second time and while the vehicle is travelling. Each of the first image pair and the second image pair can include a representation of at least one static feature in an environment of the vehicle. The method 2100 also includes determining, at 2106 and based on global positioning system (GPS) data (and/or based on loop closure data and/or data from one or more other satellite systems (e.g., Glonass, Galileo, etc.), location data associated with the vehicle. The method 2100 also includes determining, at 2108 and based on (1) a first disparity associated with the at least one static feature and the first image pair, (2) a second disparity associated with the at least one static feature and the second image pair, and (3) the location data associated with the vehicle, a correction to a disparity map associated with the first image pair and the second image pair. The correction can include at least one of a yaw correction or a depth correction.

In some implementations, the location data includes at least one of a location associated with the first image pair or a location associated with the second image pair.

In some implementations, the method 2100 also includes correcting the disparity map based on the correction, to produce a corrected disparity map.

In some implementations, the method 2100 also includes controlling an operation of the vehicle based on the corrected disparity map.

In some implementations, the method 2100 also includes generating the disparity map by determining correspondences between the first image pair and the second image pair.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method comprising:
   determining, by a computing system, a disparity correction for calibration of image data based on image pairs of a feature in an environment;
   determining, by the computing system, a failure case associated with reduction in depth accuracy based on the disparity correction; and
   updating, by the computing system, a map of the environment to identify the feature as a cause of the failure case.

2. The computer-implemented method of claim 1, further comprising:
   determining, by the computing system, at least one image pair of the image pairs fails to satisfy a threshold number of correction datapoints; and
   ignoring, by the computing system, the at least one image pair of the image pairs based on the threshold number of correction datapoints.

3. The computer-implemented method of claim 1, further comprising:
   determining, by the computing system, a sparsity of a disparity map associated with the image data based on a lack of static objects depicted in the image data that satisfy a threshold distance from each other, wherein the failure case is determined based on the sparsity of the disparity map.

4. The computer-implemented method of claim 1, further comprising:

determining, by the computing system, an object depicted in the image data associated with the failure case; and determining, by the computing system, the object is out of a field of view based on at least one of: an optical flow algorithm and a tracking algorithm.

5. The computer-implemented method of claim 1, wherein the updating the map of the environment comprises:

labeling, by the computing system, a structure in the environment as at least one of: repeated and misleading based on the failure case.

6. The computer-implemented method of claim 1, wherein the determining the failure case is based on identification of repeated structures in the image pairs.

7. The computer-implemented method of claim 1, wherein the determining the failure case is based on inaccuracies in reprojection of the image pairs.

8. The computer-implemented method of claim 1, further comprising:

determining, by the computing system, movement of one or more cameras associated with the image data; and filtering, by the computing system, disparity corrections based on the movement of the one or more cameras.

9. The computer-implemented method of claim 1, further comprising:

determining, by the computing system, a frame of the image data exceeds a threshold value for variance; and ignoring, by the computing system, the frame of the image data based on the threshold value for variance.

10. The computer-implemented method of claim 1, further comprising:

filtering, by the computing system, disparity corrections to a disparity map generated from the image data based on the failure case.

11. A system comprising:

at least one processor; and a memory storing instructions that, when executed by the at least one processor, cause the system to perform operations comprising:

determining a disparity correction for calibration of image data based on image pairs of a feature in an environment;

determining a failure case associated with reduction in depth accuracy based on the disparity correction; and updating a map of the environment to identify the feature as a cause of the failure case.

12. The system of claim 11, the operations further comprising:

determining at least one image pair of the image pairs fails to satisfy a threshold number of correction datapoints; and ignoring the at least one image pair of the image pairs based on the threshold number of correction datapoints.

13. The system of claim 11, the operations further comprising:

determining a sparsity of a disparity map associated with the image data based on a lack of static objects depicted in the image data that satisfy a threshold distance from each other, wherein the failure case is determined based on the sparsity of the disparity map.

14. The system of claim 11, the operations further comprising:

determining an object depicted in the image data associated with the failure case; and determining the object is out of a field of view based on at least one of: an optical flow algorithm and a tracking algorithm.

15. The system of claim 11, wherein the updating the map of the environment comprises:

labeling a structure in the environment as at least one of: repeated and misleading based on the failure case.

16. A non-transitory computer-readable storage medium including instructions that, when executed by at least on processor of a computing system, cause the computing system to perform operations comprising:

determining a disparity correction for calibration of image data based on image pairs of a feature in an environment;

determining a failure case associated with reduction in depth accuracy based on the disparity correction; and updating a map of the environment to identify the feature as a cause of the failure case.

17. The non-transitory computer-readable storage medium of claim 16, the operations further comprising:

determining at least one image pair of the image pairs fails to satisfy a threshold number of correction datapoints; and ignoring the at least one image pair of the image pairs based on the threshold number of correction datapoints.

18. The non-transitory computer-readable storage medium of claim 16, the operations further comprising:

determining a sparsity of a disparity map associated with the image data based on a lack of static objects depicted in the image data that satisfy a threshold distance from each other, wherein the failure case is determined based on the sparsity of the disparity map.

19. The non-transitory computer-readable storage medium of claim 16, the operations further comprising:

determining an object depicted in the image data associated with the failure case; and determining the object is out of a field of view based on at least one of: an optical flow algorithm and a tracking algorithm.

20. The non-transitory computer-readable storage medium of claim 16, wherein the updating the map of the environment comprises:

labeling a structure in the environment as at least one of: repeated and misleading based on the failure case.

* * * * *